United States Patent [19]
Takimoto

[11] Patent Number: 4,878,133
[45] Date of Patent: Oct. 31, 1989

[54] INFORMATION SIGNAL REPRODUCING APPARATUS IN WHICH A PLURALITY OF HEADS ARE SELECTIVELY USED

[75] Inventor: Hiroyuki Takimoto, Yokohama, Japan

[73] Assignee: Canon Kabushiki Kaisha, Tokyo, Japan

[21] Appl. No.: 930,704

[22] Filed: Nov. 13, 1986

[30] Foreign Application Priority Data

Nov. 15, 1985 [JP] Japan .................................. 60-254955

[51] Int. Cl.⁴ ...................... G11B 15/14; H04N 5/783
[52] U.S. Cl. ......................................... 360/64; 60/13; 60/77.14
[58] Field of Search ...................... 360/77, 10.2, 10.3, 360/18, 19.1, 64, 77.13 (U.S. only), 77.14 (U.S. only), 77.15 (U.S. only)

[56] References Cited

U.S. PATENT DOCUMENTS

| | | | |
|---|---|---|---|
| 4,184,181 | 1/1980 | Mijatovic | 360/77 |
| 4,189,758 | 2/1980 | Morio et al. | 360/77 |
| 4,209,810 | 6/1980 | Ragle et al. | 360/77 |
| 4,268,875 | 5/1981 | Morio | 360/77 |
| 4,426,666 | 1/1984 | Kobayashi et al. | 360/10.3 |
| 4,484,236 | 11/1984 | Wilkinson | 360/19.1 |
| 4,517,609 | 5/1985 | Yoshihiko | 360/19.1 |
| 4,611,252 | 9/1986 | Igata et al. | 360/10.3 |
| 4,623,940 | 11/1986 | Matsumoto | 360/10.3 |
| 4,630,146 | 12/1986 | Takayama | 360/10.2 |
| 4,672,469 | 6/1987 | Namiki et al. | 360/10.3 |

Primary Examiner—Aristotelis M. Psitos
Assistant Examiner—David L. Robertson
Attorney, Agent, or Firm—Robin, Blecker & Daley

[57] ABSTRACT

A rotary head type reproducing apparatus having pairs of rotary heads each of the pairs consisting of two heads which have different azimuth angles and are arranged close to each other to reproduce signals from a record bearing medium on which many tracks are formed in parallel with the azimuth angles of adjacent tracks differentiated from each other is arranged to selectively produce the outputs of the pair of rotary heads according to a tracking control signal obtained from the signals reproduced by the pair of rotary heads.

12 Claims, 2 Drawing Sheets

INFORMATION SIGNAL REPRODUCING APPARATUS IN WHICH A PLURALITY OF HEADS ARE SELECTIVELY USED

BACKGROUND OF THE INVENTION

1. Field of the Invention

This invention relates to a rotary head type reproducing apparatus and more particularly to a reproducing apparatus arranged to reproduce signals from a record bearing medium on which many tracks are formed in parallel to have different azimuth angles between adjacent tracks by means of a pair of rotary heads which are arranged close to each other to have different azimuth angles.

2. Description of the Related Art

Generally, when a record bearing tape is allowed to travel at a speed differing from a recording speed for the so-called high speed search reproduction or a slow motion reproduction with a rotary two-head type video cassette recorder (hereinafter referred to as VCR), the reproducing heads of the VCR come to move across a plurality of tracks having different azimuth angles. As a result of this, several noise bars appear on the reproduced picture plane. However, in the case of a VCR having two pairs of so-called double-azimuth heads with each pair consisting of closely adjacent heads of different azimuth angles, the noise bars almost completely disappear during a high speed search reproduction operation as the reproduction is accomplished by selectively using the outputs of four heads. The selecting action on the outputs of these four heads has been controlled by detecting the levels of the signals produced from the two heads of each double azimuth head pair and by comparing the amounts of the detection outputs thus obtained. However, this conventional method results in a complex arrangement of the reproducing apparatus because of additional amplification and detection circuits which must be connected to the output amplifiers of these heads. Further, the increase in the number of circuit elements to be connected to the output amplifiers causes degradation of the S/N ratio of the reproduced signals and thus results in a deteriorated quality of the reproduced picture.

SUMMARY OF THE INVENTION

It is a general object of this invention to provide a rotary head type reproducing apparatus which is capable of solving the above-stated problem.

It is a more specific object of this invention to provide a rotary head type reproducing apparatus which is capable of adequately carrying out reproduction with a simple circuit arrangement even in cases where a record bearing medium is allowed to travel for reproduction at a speed different from a speed employed for recording.

It is another object of this invention to provide a rotary head type reproducing apparatus which is capable of carrying out reproduction without deteriorating the reproduced signal by selectively using rotary heads having different azimuth angles.

Under this object, an apparatus which is arranged according to this invention to reproduce signals recorded on a record bearing medium on which many tracks are formed in parallel with the magnetizing directions of adjacent tracks differentiated from each other among them comprises: a pair of rotary heads which have different azimuth angles and are disposed close to each other; means for forming a tracking error signal by using signals reproduced from the record bearing medium at least by one of said pair of rotary heads; control means for controlling on the basis of the tracking error signal the relative positions of the record bearing medium and the pair of rotary heads; and means for selectively producing one of the signals reproduced by the pair of rotary heads according to the tracking error signal.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
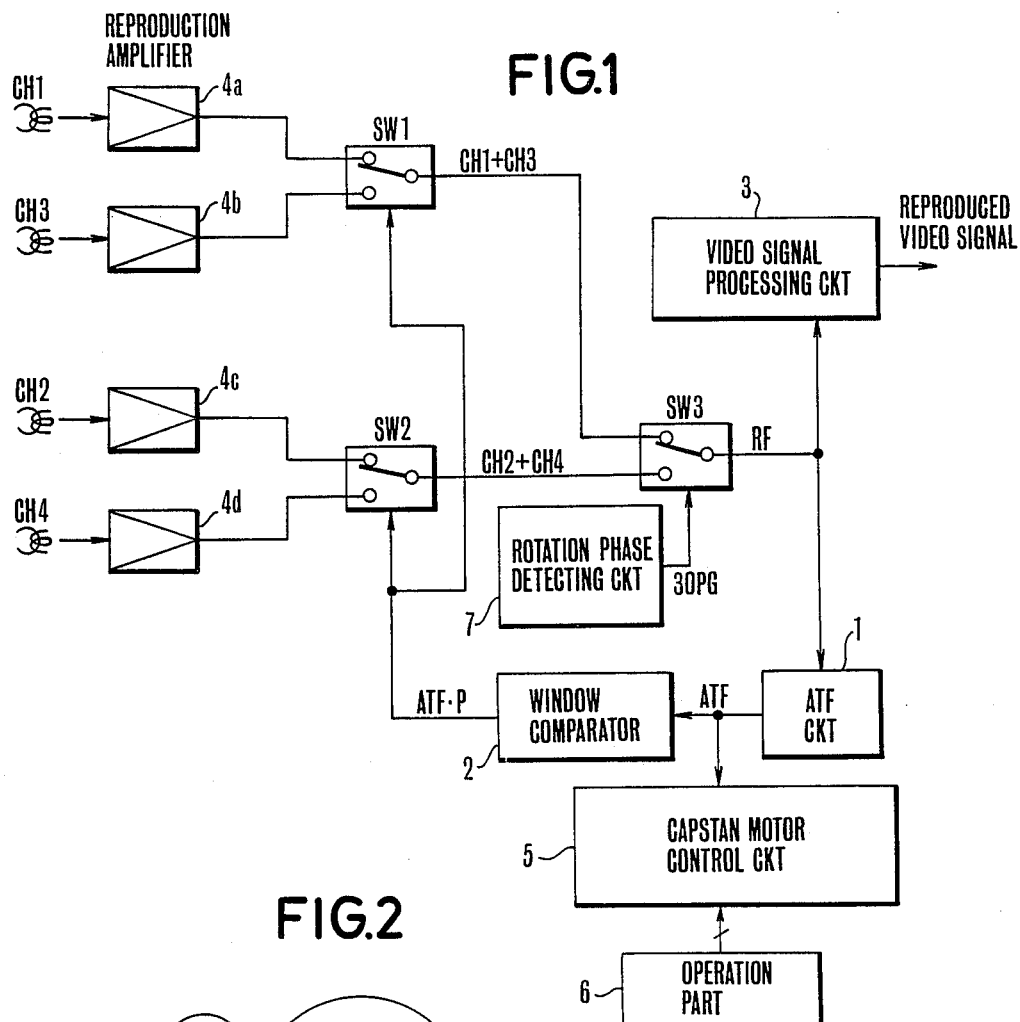
FIG. 1 is a block diagram showing the arrangement of the essential parts of a VCR embodying this invention.
Figure 2:
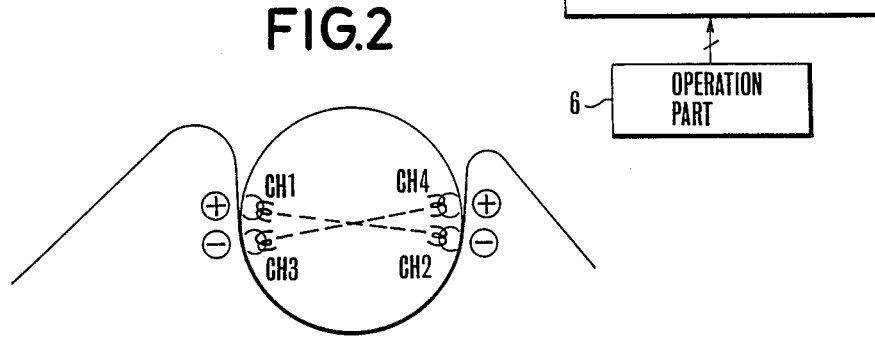
FIG. 2 is an illustration of the head arrangement of the VCR of FIG. 1.
Figure 3:
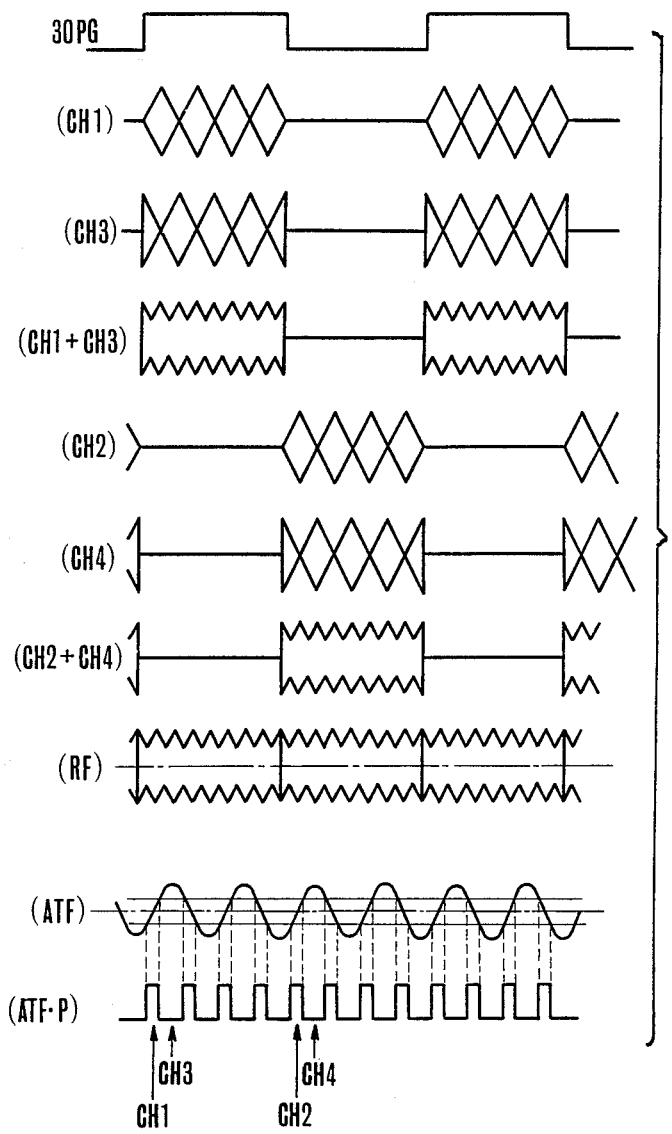
FIG. 3 is a timing chart showing the wave forms of the outputs of various parts shown in FIG. 1.

FIG. 1 is a block diagram showing in outline the arrangement of the essential parts of a VCR arranged as an embodiment of this invention. FIG. 2 shows the arrangement of the heads of the same VCR on a rotary drum. FIG. 3 is a timing chart showing the wave forms of the outputs of various parts of FIG. 1 obtained during a high speed search reproducing operation. Referring to FIGS. 1 and 2, the VCR is provided with rotary heads CH1, CH2, CH3 and CH4. The heads CH1 and CH4 have the same azimuth angles while the azimuth angle of the head CH2 is the same as that of the head CH3. However, the azimuth angle of the heads CH1 and CH4 differs from that of the heads CH2 and CH3. Each of switches SW1, SW2 and SW3 is arranged to shift its connecting position from one position to the other according as a control input level thereof changes between high and low levels. The switches SW1 and SW2 are arranged to operate under a pulse signal (hereinafter referred to as signal ATF·P) which is obtained on the basis of a tracking control signal (hereinafter referred to as signal ATF). In FIG. 3, the outputs of these switches SW1 and SW2 are shown as to have wave forms (CH1+CH3) and (CH2+CH4) respectively. The switch SW3 is arranged to operate under the control of a rectangular wave signal which changes its level between high and low levels every 1/60 sec. in synchronism with the rotation of the rotary drum (hereinafter referred to as 30PG signal). The output of the switch SW3 is in a wave form (RF) as shown in FIG. 3. The block diagram of FIG. 1 includes a tracking control circuit 1 (hereinafter referred to as ATF circuit) which is arranged to operate according to the known four frequency method; a window comparator 2; a video signal processing circuit 3; and reproduction amplifiers 4a, 4b, 4c and 4d.

Referring to FIG. 1, the output signal RF of the switch SW3 is converted into an original video signal by the video signal processing circuit 3. At the same time, pilot signals of four different frequencies which are included in the signal RF and are superimposed on and recorded together with information signals in the recording tracks for the purpose of obtaining the signal ATF are supplied to the tracking control circuit (ATF circuit) 1. Upon receipt of these pilot signals, the circuit 1 forms the signal ATF, which is supplied to a capstan motor control circuit 5.

The capstan motor control circuit 5 performs tracking control on the basis of the signal ATF and is thus arranged to cause the tape or the record bearing medium to travel at a speed designated through an operation part 6. When, for example, an instruction is given from the operation part 6 to perform normal reproduction, the tape is caused to travel at the same speed as the recording tape speed. In the event of an instruction for high speed search reproduction, the tape is caused to travel at a speed several times as high as a speed employed in recording. If the instruction is for slow motion reproduction, the tape is caused to travel at a speed several times as slow as the recording speed.

In the case of a high speed search reproducing operation, the wave form of the signal ATF becomes as shown at a part (ATF); in FIG. 3. This wave form is shown on the assumption that each of the pairs of heads CH1 and CH3 and the heads CH2 and CH4 are disposed close to each other and are arranged to have the same tracing locus. The signal ATF is converted into the signal (ATF·P) as shown in FIG. 3 by means of the window comparator 2 of FIG. 1. When the level of the signal ATF is higher than a predetermined level and also when it is lower than another predetermined level, the signal ATF·P is produced at a low level in both cases. When the level of the signal ATF is between the two predetermined levels, the signal ATF·P is produced at a high level. Further, a similar pulse signal is obtainable by replacing the above-stated window comparator 2 with a Schmitt trigger circuit having some hysteresis.

When the signal ATF·P is at a high level with the signal ATF at a level between the above-stated two predetermined levels, the center line of the double azimuth head pair CH1+CH3 is tracing a track the azimuth angle of which coincides with that of the head CH1. In this instance, therefore, a signal reproduced by the head CH1 is used. When the level of the signal ATF·P becomes low, the tracing position of the center line of the head CH1 comes to a track of an opposite azimuth angle while the azimuth angle of the head CH3 coincides with that of this track. In that instance, therefore, a signal reproduced by the head CH3 is used. The signal RF which is to be introduced to the video signal processing circuit 3 is thus obtained by effecting switchover between the signals reproduced by the heads CH1 and CH3 according to whether the signal ATF·P is at a high level or at a low level. By this arrangement, the signal RF is always obtainable at a sufficiently high level. Besides, even in the event of high speed search reproduction or slow motion reproduction, noise bars can be suppressed to a negligible degree on the reproduced picture plane.

Meanwhile the other double azimuth head CH2+CH4 is arranged to have their reproduced signals selectively introduced to the video signal processing circuit 3 according to the signal ATF·P in the same manner when they are tracing the magnetic tape which is employed as the record bearing medium.

In the case of the VCR described, the magnetic tape is wrapped at least 180 degrees round the rotary drum and the record on the tape is reproduced by means of the two pairs of double azimuth heads arranged at a phase difference of 180 degrees. This invention, however, is applicable to any VCR arranged to perform reproduction of records by an n number of double azimuth head pairs arranged at a phase difference of $(360/n)°$ with the tape wrapped round a rotary drum within a wrapping angle of at least $(n-1/n \times 360)°$, wherein n represents an integer not less than 3.

Further, this invention is likewise applicable to any VCR that is arranged to perform reproduction by wrapping the tape round a rotary drum within a wrapping angle of at least $n/m \times 360°$ (m: an integer and n: a positive integer less than m) and by means of one double azimuth head pair with time based expansion effected by m/n times.

As described in the foregoing, a rotary head type reproducing apparatus arranged in accordance with this invention is capable of giving adequately reproduced signals without recourse to any complex circuit arrangement, even in cases where the record bearing medium is allowed to travel at a speed different from a speed employed in recording.

What is claimed is:

1. An apparatus for reproducing information signals recorded on a record bearing medium on which many tacks are formed in parallel with the magnetizing directions of adjacent tracks differentiated from each other among them, comprising:
    (a) a pair of rotary heads which have different azimuth angles and are disposed close to each other;
    (b) switching means for selectively outputting two signals reproduced by the pair of rotary heads;
    (c) forming means for forming a tracking error signal by using signals output from said switching means;
    (d) reproducing means for reproducing said information signals by using signals output from said switching means;
    (e) control means for controlling, on the basis of said tracking error signal, the relative positions of said record bearing medium and said pair of rotary heads; and
    (f) change-over means for changing the state of said switching means on the basis of said tracking error signal.

2. An apparatus according to claim 1, wherein said pair of rotary heads are arranged to trace the same part of said record bearing medium; and said tracking error signal is at a level corresponding to the degree of positional error of the tracing position of said pair of rotary heads from one of said many tracks.

3. An apparatus according to claim 2, wherein said tracking error signal is at a zero level when the tracing locus of said pair of rotary heads coincides with said one of said many tracks and arranged to be either at a positive level or at a negative level to indicate the direction in which said positional deviation takes place.

4. An apparatus according to claim 3, wherein said change-over means includes a window comparator which is arranged to receive said tracking error signal and to produce a switching signal for changing the state of said switching means.

5. An apparatus according to claim 3, wherein pilot signals of four different frequencies are recorded in rotation in a predetermined sequence in said many recording tracks and said tracking error signal forming means includes separating means for separating said pilot signals from signals output from said switching means.

6. An apparatus according to claim 1, further comprising moving means for moving said record bearing medium in the direction of crossing said many tracks, and wherein said control means includes movement control means for controlling said moving means on the basis of said tracking error signal.

7. An apparatus according to claim 6, further comprising indicating means for indicating a moving speed at which said record bearing medium is caused to move by said moving means, said indicating means is arranged to indicate one of speeds different from each other.

8. An apparatus according to claim 7, wherein said movement control means is arranged to control said moving means according to said moving speed indicated by said indicating means.

9. An apparatus for reproducing information signals recorded on a record bearing medium on which many tracks are formed in parallel with the magnetizing directions of adjacent tracks differentiated from each other among them, comprising:

(a) a first pair of rotary heads which have different azimuth angles and are disposed close to each other;

(b) a second pair of rotary heads which have different azimuth angles and are disposed close to each other, said first and second pairs of rotary heads being arranged to revolve at a phase difference of 180 degrees from each other;

(c) switching means for selectively outputting four signal reproduced by said first and second pairs of rotary heads;

(d) tracking error signal forming means for forming a tracking error signal by using signals output from said switching means;

(e) reproducing means for reproducing said information signals by using signals output from said switching means;

(f) control means for controlling the relative positions of said record bearing medium and said first and second pairs of rotary heads on the basis of said tracking error signal; and (g) change-over means for changing the state of said switching means on the basis of said tracking error signal.

10. An apparatus according to claim 9, wherein said switching means includes a first switching circuit which is arranged to selectively output two signals reproduced by said first pair of rotary heads, a second switching circuit which is arranged to selectively output two signals reproduced by said second pair of rotary heads, and a third switching circuit which is arranged to selectively output two signals output by said first and second switching circuits 11. An apparatus according to claim 10, wherein said change-over means includes a first switching control circuit which is arranged to control said first and second switching circuits on the basis of said tracking error signal.

12. An apparatus according to claim 11, wherein said change-over means further includes a second switching control circuit which is arranged to control said third switching circuit on the basis of the revolving phase of one of said first and second pairs of rotary heads.

* * * * *